June 24, 1924.  
H. G. GOULD  
COASTER WAGON  
Filed May 29, 1922  
1,498,652
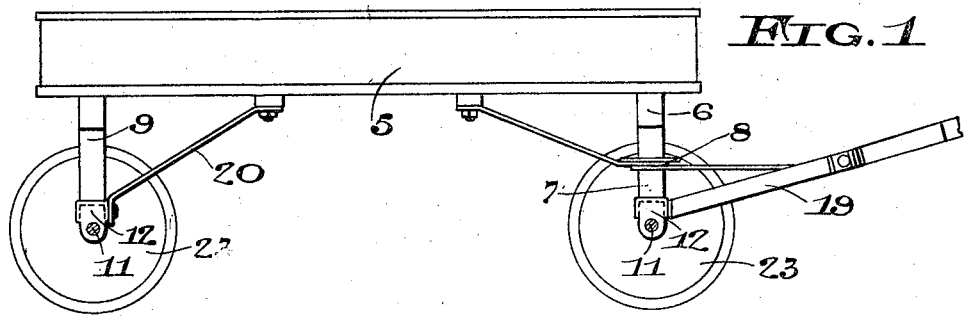
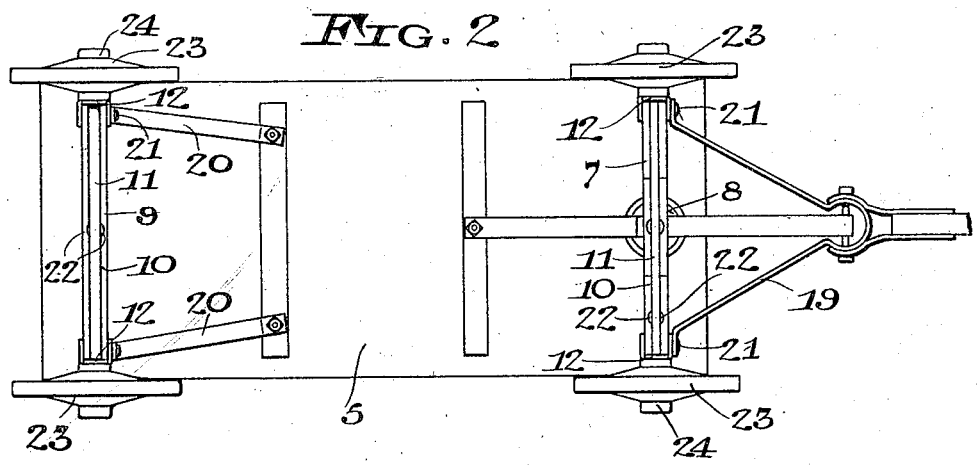
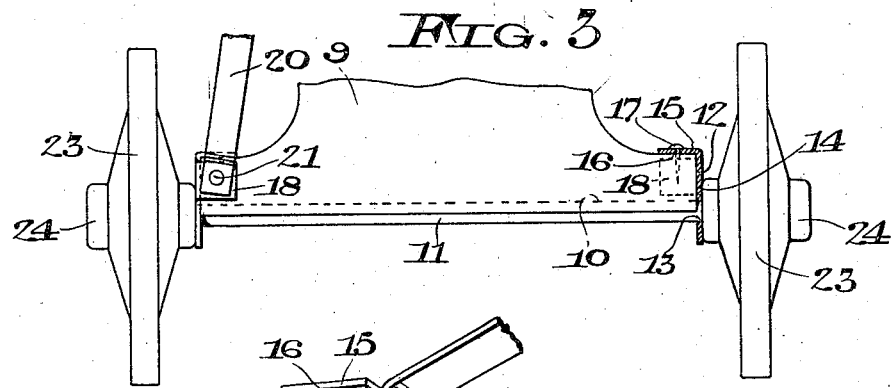
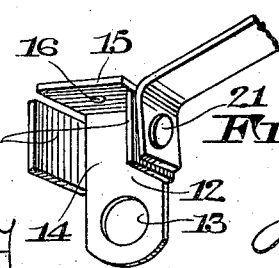
WITNESSES  
M. E. Downey  
C. L. Naal
INVENTOR  
Harry G. Gould.  
By R. S. Caldwell  
ATTORNEY Patented June 24, 1924.

1,498,652

UNITED STATES PATENT OFFICE.

HARRY G. GOULD, OF OSHKOSH, WISCONSIN, ASSIGNOR TO GOULD MANUFACTURING COMPANY, OF OSHKOSH, WISCONSIN, A CORPORATION OF WISCONSIN.

COASTER WAGON.

Application filed May 29, 1922. Serial No. 564,430.

*To all whom it may concern:*

Be it known that I, HARRY G. GOULD, a citizen of the United States, and resident of Oshkosh, in the county of Winnebago and State of Wisconsin, have invented new and useful Improvements in Coaster Wagons, of which the following is a description, reference being had to the accompanying drawings, which are a part of this specification.

The invention relates to coaster wagons and more particularly to the running gear thereof.

It has been customary to use bolts to secure the axle to the bolster, the holes for the bolts being drilled through the axle and bolster, and where such constructions are used the axles frequently break at their drilled portions. The present invention is designed to eliminate the use of bolts passed through the axle, and also to eliminate the use of bolts for securing the hound or rear axle brace to the bolster by the novel construction hereinafter described.

The invention further consists in the several features hereinafter set forth and more particularly defined by claims at the conclusion hereof.

In the drawings: Fig. 1 is an elevation view, partly in section, of a coaster wagon embodying the invention; Fig. 2 is a bottom plan view thereof; Fig. 3 is an elevation view of one of the bolsters, parts being shown in section; Fig. 4 is a detail perspective view of one of the parts.

In the drawings the numeral 5 designates the wagon-box, 6 the upper front bolster, 7 the lower front bolster, having the usual fifth wheel connection 8 with the bolster 6, and 9 the rear bolster.

Both the front bolster 7 and the rear bolster 9 are provided with a semicylindrical groove 10 in which the axle 11 is mounted. In each instance the axle 11 is firmly secured to the bolster by means of axle plates or retainers 12 provided with openings 13 through which the axle passes. These plates have parts 14 abutting against the ends of the bolster and a flange 15 which may be provided with a hole 16 for a nail 17 or other suitable fastener to prevent endwise movement of the plates. These plates also have side flanges 18 formed integral therewith or secured thereto, which engage opposite sides of the bolster to prevent lateral movement of the plate.

As previously explained, the ends of the hound 19 and the rear axle braces 20 are usually bolted to the bolsters but in the present instance such connections have been eliminated by rigidly or fixedly connecting the hound and the rear axle braces to the plates 12, as by rivets 21. Thus the ends of the hound 19 are connected to the axle-plates at the ends of the front bolster and each axle brace 20 is connected at one end to the wagon-box and at the other to one of the axle-plates. The plates 12 are so fitted onto the ends of the bolster as to hold the axle firmly seated in the groove 10. The axles 11 may be provided with lugs 22 engageable with the bolster to hold them stationary.

The wheels 23 are journalled on the axles between the axle-plates 12 and the hub-caps 24, and since the plates 12 are between the ends of the bolster and the wheels endwise movement of said plates is also prevented by this arrangement.

Wagons of this type must be capable of shipment in knock down conditions and the arrangement of the running-gear as above described makes it a simple matter to assemble the parts thereof.

I claim—

1. In a coaster wagon, the combination with a bolster having an axle-receiving groove, and an axle, of axle retainer members at the ends of the bolster, each member having a part abutting against one end of the bolster and through which the axle passes, and side and top flanges fitting the bolster.

2. In a coaster wagon, the combination with the front and rear bolsters, each having an axle-receiving groove, and the axles, of axle retainer members at the ends of the bolsters, each member having a part abutting against one end of the bolster and through which the axle passes, and side and top flanges fitting the bolster, a hound, means fixedly securing the end portions of the hound to the retainer members on the front bolster, rear braces, and means fixedly securing said rear braces to the retainer members on the rear bolster.

3. In a coaster wagon, the combination with an axle, a bolster supportingly engaged therewith, of axle retainer members at the ends of the bolster, each member having a part abutting against one end of the bolster and through which the axle passes, a top flange engaging the bolster, and means for preventing lateral movement of said member with respect to the bolster.

4. In a coaster wagon, the combination with the front and rear bolsters, each having an axle-receiving groove, and the axles, of axle retainer members at the ends of the bolsters, each member having a part abutting against one end of the bolster and through which the axle passes, and side and top flanges fitting the bolster, a hound having its ends riveted to side flanges of the retainer members on the front bolster, and rear axle braces, the ends of said braces being riveted to side flanges of the retainer members on the rear bolster.

In testimony whereof I affix my signature.

HARRY G. GOULD.